April 26, 1955 G. S. EDWARDS Re. 23,984

INCUBATOR

Original Filed Jan. 14, 1948 7 Sheets-Sheet 1

Inventor
George S. Edwards

By R. V. Dechur,
Attorney

April 26, 1955 G. S. EDWARDS Re. 23,984

INCUBATOR

Original Filed Jan. 14, 1948 7 Sheets-Sheet 2

Inventor

George S. Edwards

By

F. W. Dabney,

Attorney

April 26, 1955 G. S. EDWARDS Re. 23,984

INCUBATOR

Original Filed Jan. 14, 1948 7 Sheets-Sheet 3

Inventor

George S. Edwards

By

H. W. Dahn,

Attorney

INCUBATOR

Original Filed Jan. 14, 1948 7 Sheets-Sheet 4

Inventor

George S. Edwards

By

A. W. Dahm

Attorney

April 26, 1955 G. S. EDWARDS Re. 23,984

INCUBATOR

Original Filed Jan. 14, 1948 7 Sheets-Sheet 5

Inventor

George S. Edwards

By

R. W. Dahlen,

Attorney

INCUBATOR

Original Filed Jan. 14, 1948 7 Sheets-Sheet 6

Inventor
George S. Edwards
By
Attorney

Inventor

George S. Edwards

By F. W. Dabney, Attorney

United States Patent Office

Re. 23,984

Reissued Apr. 26, 1955

23,984

INCUBATOR

George S. Edwards, deceased, late of Greencastle, Pa., by Helen S. Edwards, executrix, Greencastle, Pa., assignor to Valley Mechanical Co., Inc., Greencastle, Pa., a corporation of Pennsylvania Original No. 2,654,345, dated October 6, 1953, Serial No. 2,165, January 14, 1948. Application for reissue July 23, 1954, Serial No. 445,495

18 Claims. (Cl. 119—37)

Figure 1:
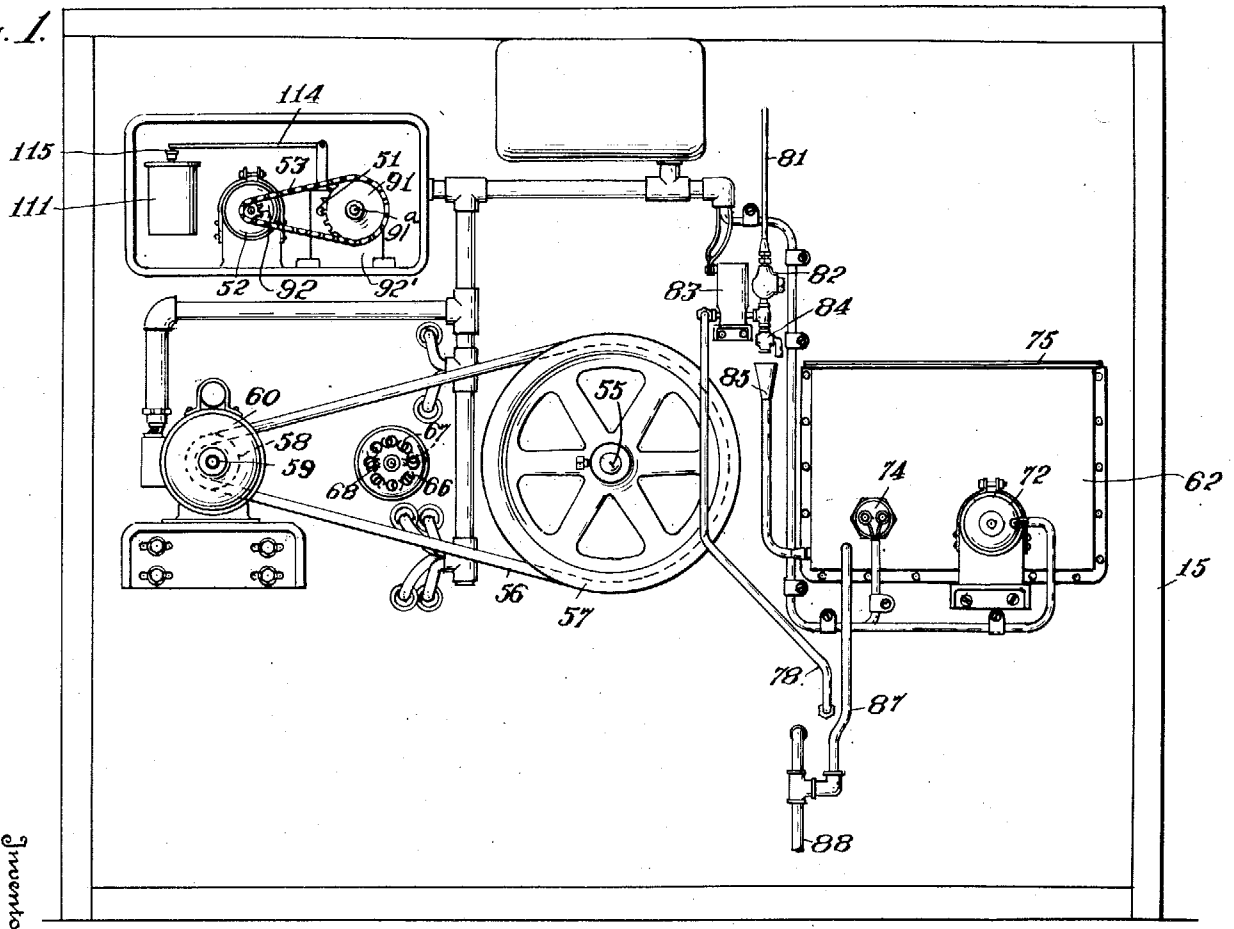

Matter enclosed in heavy brackets [ ] appears in the original patent but forms no part of this reissue specification; matter printed in italics indicates the additions made by reissue.

My invention relates to an incubator from which eggs are transferred to a hatcher in the final stages of the hatching process, though both may be incorporated in a unitary structure, and it is an object of the same to simplify the construction of the egg trays and the means for supporting them in stacks, so that the trays can be more readily placed in either the incubator or the hatcher, or transferred from one to the other.

Another object of the invention is to provide improved means for oscillating the trays, combined with improved means for creating a reversible air circulation about and through the trays.

Another object is to provide improved means for maintaining the desired temperature in a chamber of an incubator or hatcher.

Another object is to provide improved means for controlling the humidity of the atmosphere in such a chamber.

Another object is to provide means whereby egg trays in an incubator are given a peculiar compound movement due to rocking a tray laterally on an axis close to its bottom and simultaneously giving it a swinging or oscillating motion about an axis removed at one end of the tray from the first-named axis. By this movement the eggs are not only rocked but they are made to roll or rock to some extent about a vertical axis passing through each one of them, with very desirable results in hatching.

Referring to the accompanying drawings, which are made a part of this application and in which similar reference characters indicate similar parts:

Fig. 1 is a rear elevation of the device of my invention.

Figure 2:
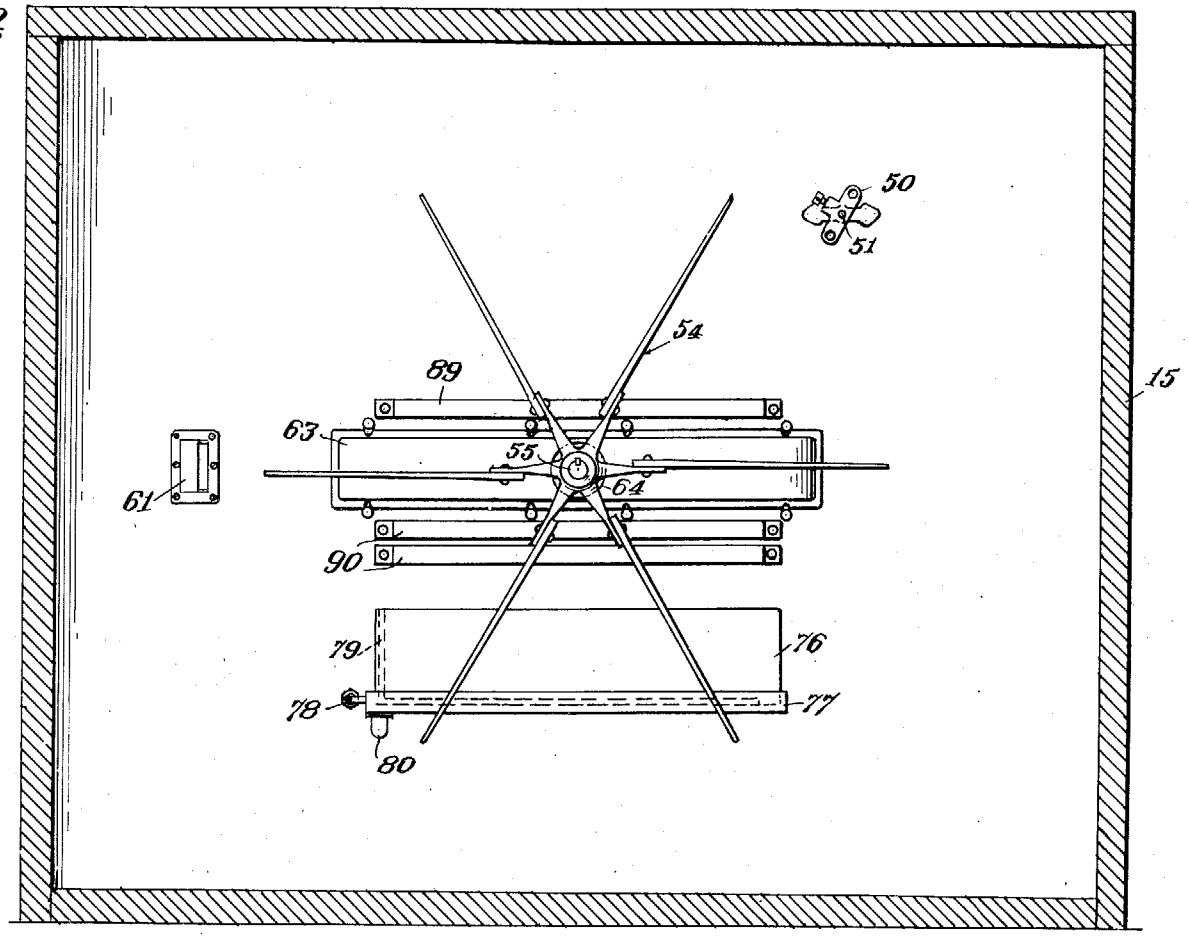
Figure 3:
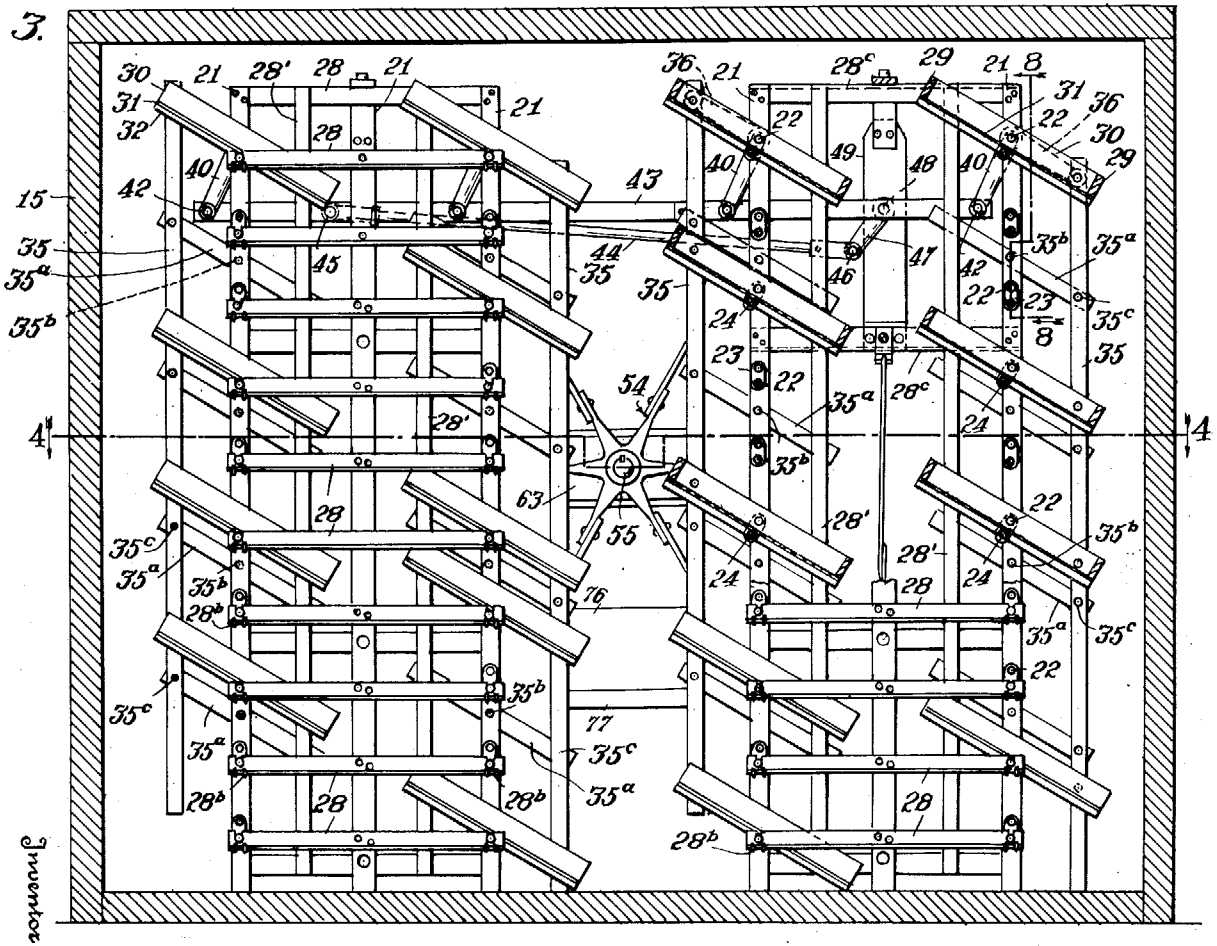
Figure 4:
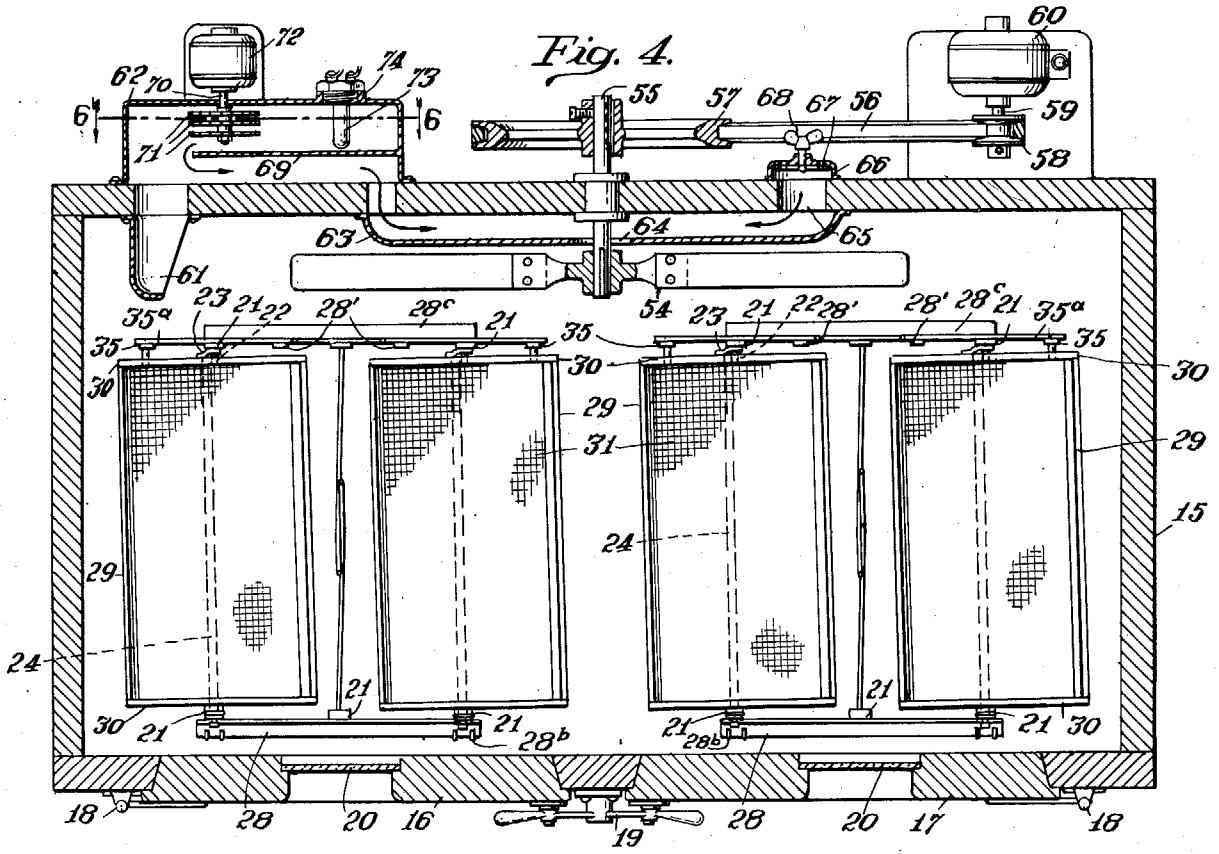
Figure 5:
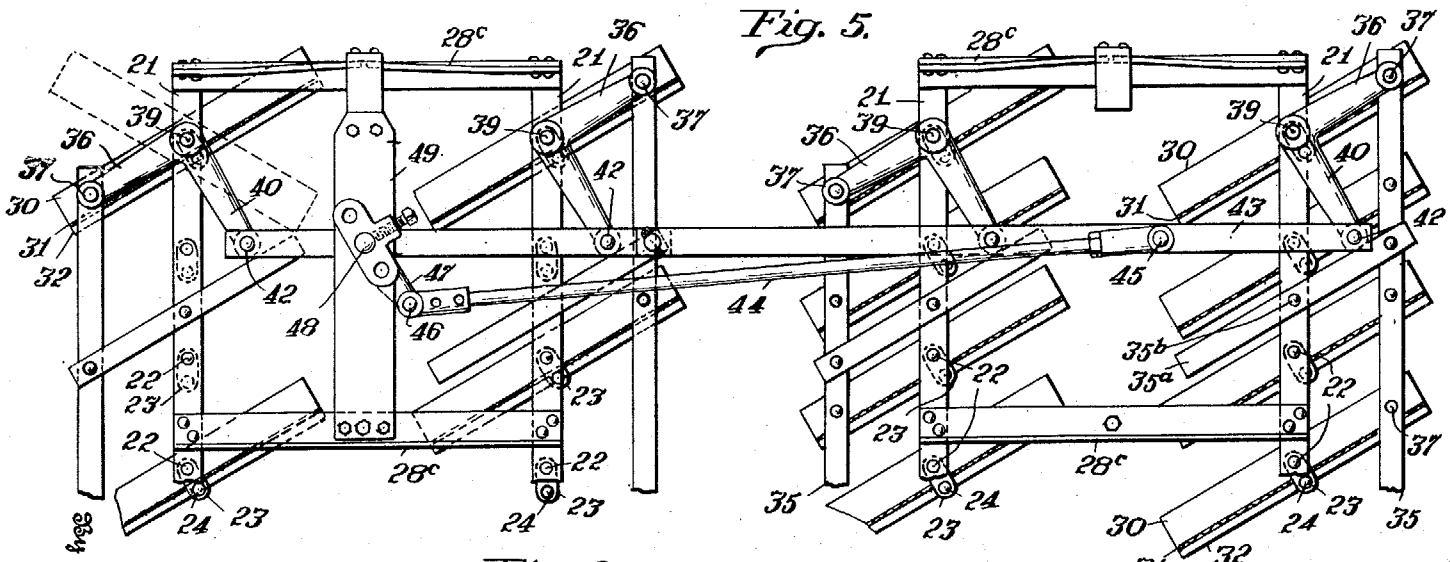
Figure 9:
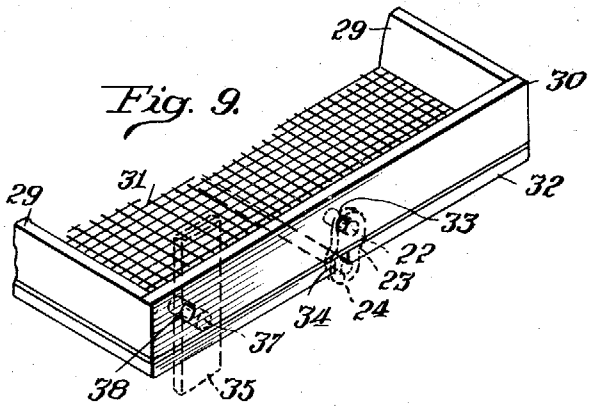
Figure 6:
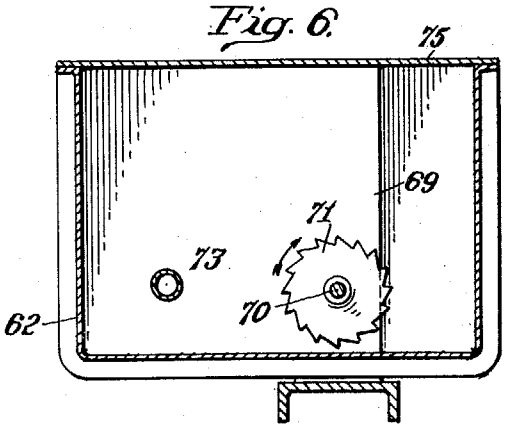
Figure 7:
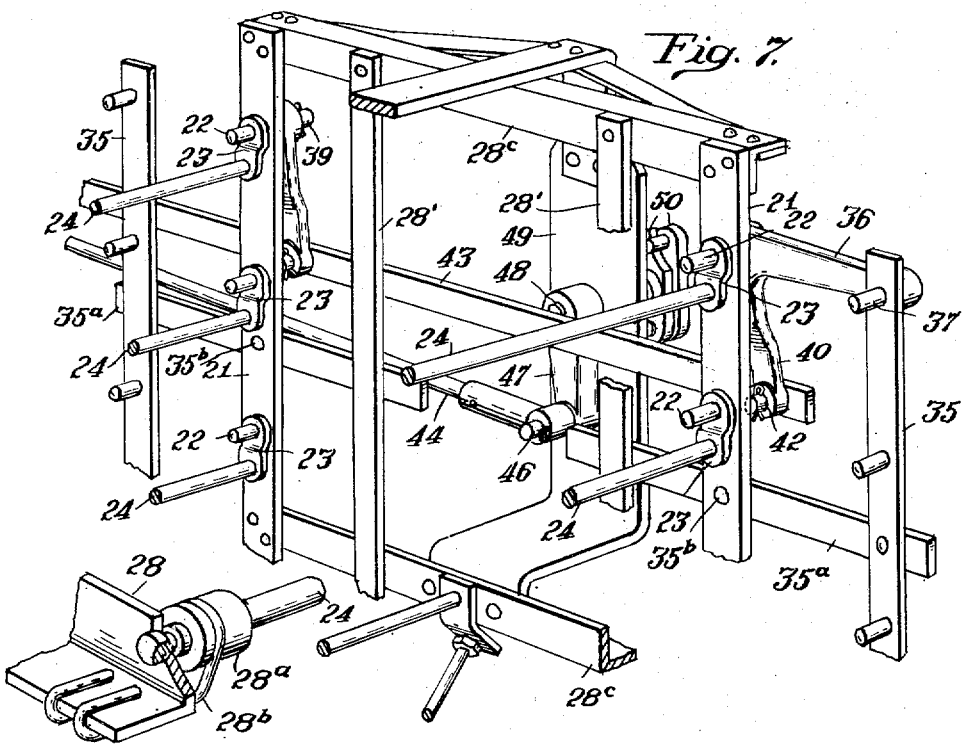
Figure 8:
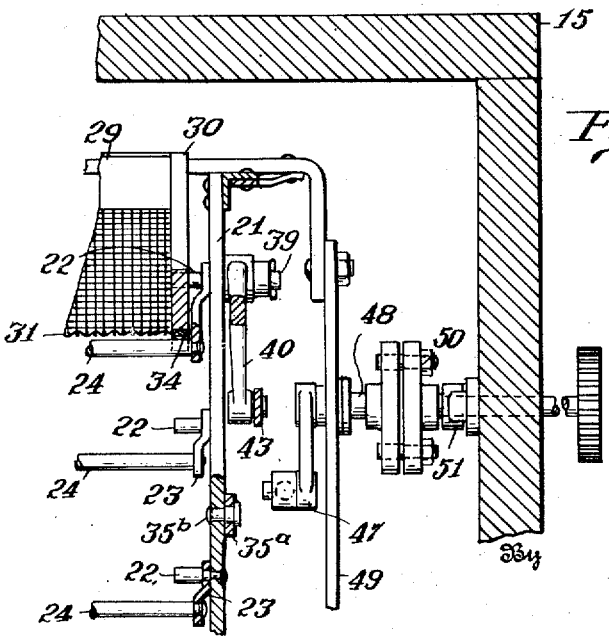
Figure 11:
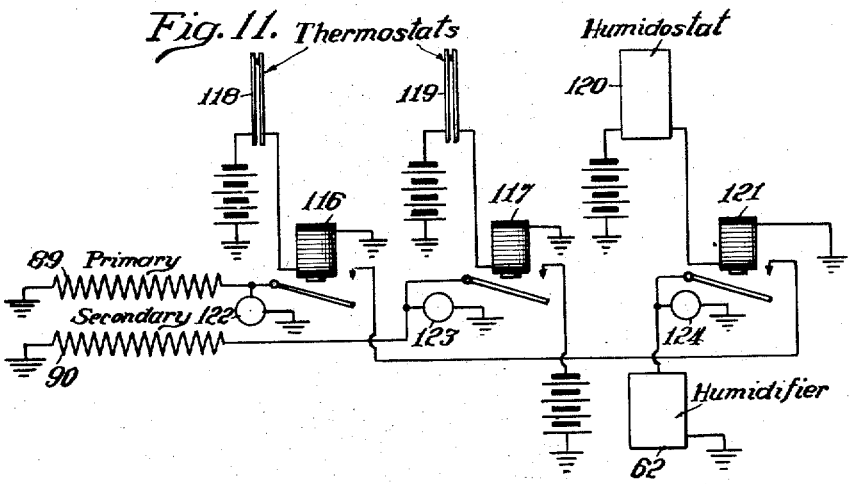
Figure 10:
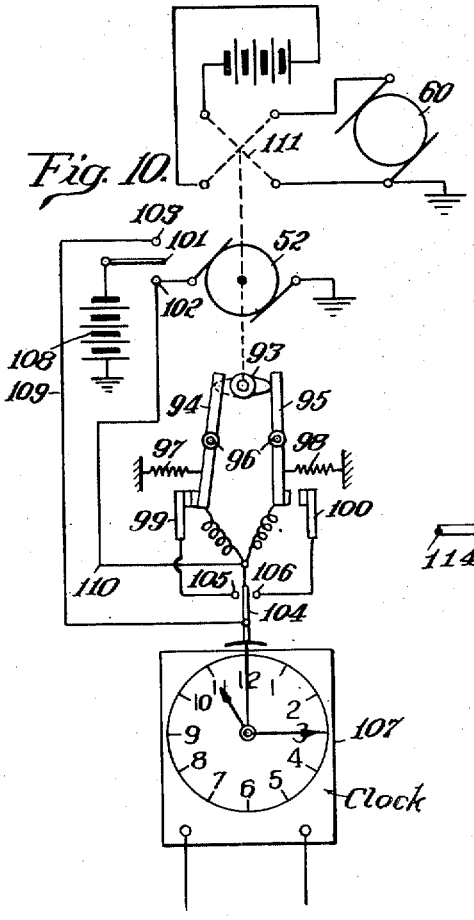
Figure 12:
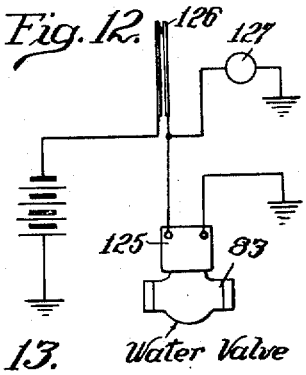
Figure 13:
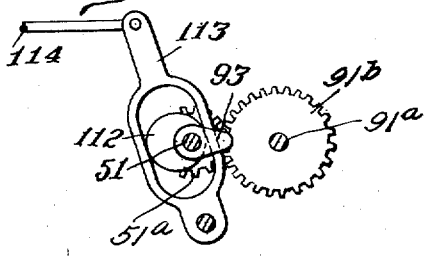

Fig. 2, an elevation of the rear wall of the incubating chamber, viewed from the inside, Fig. 3, a similar elevation, with the stacks of egg trays in place, and parts being omitted for clearness, Fig. 4, a section on line 4—4 of Fig. 3, Fig. 5, an enlarged rear elevation of the driving means for oscillating the trays in a pair of stacks, Fig. 6, an enlarged section on line 6—6 of Fig. 4, Fig. 7, a partial perspective of rocking means for the trays, Fig. 8, a section on line 8—8 of Fig. 3, Fig. 9, an enlarged perspective of parts of an egg tray and its supporting means, Fig. 10, an enlarged wiring diagram of the electrical apparatus, Fig. 11, a schematic wiring diagram of the heating and humidifying devices, Fig. 12, a schematic wiring diagram of the cooling apparatus, and Fig. 13, an enlarged detail of the egg tray rocking means.

In the drawings, which show a form of the invention at present preferred by me, reference character 15 indicates generally a casing or cabinet, having doors at 16, 17, affording access to the interior chamber of the cabinet, said doors being hinged at 18, 18, to swing outward away from each other, the doors being secured in closed position by means indicated at 19 and having windows 20. Two cabinets are used for hatching eggs, the one being used for preliminary incubation and the other to complete the final hatching, all as well understood by those skilled in the art. Both cabinets may be combined in a single structure if desired, and duplicate mechanisms may be provided for heating humidity control, air circulation, etc., whether the cabinets are combined into one structure or are separate. In this specification the invention will be described as embodied in a cabinet with an incubating chamber, the hatching cabinet not being shown.

Means for supporting two stacks of trays are shown in the drawings, it being understood that the chamber may be built to accommodate any convenient or desirable number of such stacks. The supporting means comprises a frame rectangular in horizontal section, each frame having three uprights 21 on two of which are fixed pivot pins 22, each having a depending arm 23 to which is fixed one end of a tray rod 24, the other end of said rod being journaled in a slot in a cross-member 28 at the front of the frame next to a door of the cabinet, the rod 24 carrying a collar 28a for spacing a tray from the fixed member 28, to which the collar is secured by a bent wire connector 28b (Fig. 7). The two rear uprights 21 of the stack supporting frames are connected by cross members 28c, 28c, whereas members 28 at the front of the frame are supported at their middle by being bolted to the front upright 21. Two narrow uprights 28' are provided on each unit, they being secured to cross members 28, 28, at the rear of the unit.

The trays, best shown in Fig. 9, consist of side members 29, end members 30 and a wire screen bottom 31 held in place by strips 32 that may be nailed or otherwise secured to the side and end portions, according to the material used. A hole at 33 in the rear end of member 30 (Fig. 9) affords entrance to the pin 22 when the tray is slid endwise from the front of the stack frame toward the rear. It will be noted that this can easily be done because the single upright 21 at the front of a unit is out of the way of a tray that is being inserted into either one of the two banks of trays in a unit, or is being removed from such a bank. The strips 32 of the tray are notched at 34 to receive the rod 24 by which the tray is pivotally supported in the stack frame, the pin 22 also serving as a pivot about which the tray and tray rod may swing, but preventing tilting of the tray relative to arm 23. The tray fits closely enough between arm 23 and collar 28 as to prevent any substantial sliding movement backward and forward of the stack frame.

For swinging the trays from one inclined position such as that shown in Fig. 3 (which may be one extreme position) to an oppositely inclined position, I provide means comprising a tilting rod 35 for each stack unit, said rod being supported by levers 35a pivoted at 35b on rear uprights 21 and guided in their pivoted movement by uprights 28' (Fig. 5) and bracket 49 (Fig. 7) levers 35a being pivoted to the rod at 35c, said rod 35 being movable up and down by reason of its connection to one arm of a bent lever 36.

Each rod 35 has pins 37 projecting toward the stack of trays and spaced so that each tray of a stack will be engaged by a pin 37 that fits in a hole 38 in the rear end of the tray, and so moves the tray about its pivot 22 as the tilting rod is moved endwise. Upright bars 28' limit lateral swinging of the levers. The proportions of the parts are, of course, so arranged that the arm 36 and the trays actuated thereby move in proper relation with the rod 35, which has a movement of oscillation, combined with its endwise movement.

The bent lever is pivoted at 39 on a pin that may be a continuation of one of the pins 22 and has a depending arm 40 which is connected at 42 to a horizontal bar 43, there being a similar arm for each stack and all arms being connected in like manner to the bar 43. This bar is reciprocated by means comprising a link 44 pivoted at 45 to bar 43 and pivoted at 46 to a crank 47 on a shaft 48, journaled in a bearing mounted on a bracket 49 fixed to the frame of one of the stacks and connected by a quickly detachable shaft coupling 50 to a shaft 51 journaled in a wall of the cabinet, and driven from a motor 52 through sprocket gearing including a sprocket chain indicated at 53 (Fig. 1).

The device of my invention includes a fan 54 on a shaft 55 journaled in the rear wall of the cabinet and driven by means of a belt 56 passing over pulleys 57 and 58 respectively mounted on the fan shaft and on the shaft 59 of a reversible motor 60, said fan preferably being flat-bladed; i. e., having blades lying individually in planes radiating from the axis of the fan.

For improved humidity control there is provided at the rear of the mechanism a tunnel formed by an air scoop 61 at one side of the fan 54 and in position to receive directly a portion of the air driven by the fan; a casing 62 providing a water reservoir at its lower part; and an inner conduit 63 having an opening 64 at the center for the fan shaft, which opening may preferably be concentric with the fan shaft, though not necessarily so. A port for admission of fresh air is shown at 65 and is shown as being closed by a lid 66 (Figs. 1 and 4) comprising superimposed closure plates with registering apertures 67. A handle 68 serves for rotating one plate on the other to vary the size of the openings at said apertures or to close the port entirely if desired.

The reservoir 62 contains means for forming a spray to moisten the air passing through the tunnel and also has means to supply steam to the air current, to supplement the moisture supplied by spraying water in the tank. For these purposes the casing contains a partition 69 (Figs. 4 and 6) providing an inner passage for the main current of air from the scoop 61, and an outer compartment in which air circulates to a lesser degree, said partition being mainly intended to prevent any spray from being carried through the tunnel into the cabinet by the draft in the tunnel. A shaft 70 carries any desirable number of rotary toothed spraying disks 71 for throwing droplets of water upward from a body of water of suitable depth in the lower part of the reservoir. The shaft is driven by a motor 72. The means whereby the temperature of the air in the outer compartment may be raised for vaporizing the water of the spray to a desired extent comprises an electric heater 73 of rod-like form projecting through the wall of the tank into the tank and held in place by any suitable supporting and sealing means indicated at 74. A lid 75 closes the tank.

Cooling means is provided in the incubating compartment (Fig. 2) said means comprising a tank 76 for cooling fluid behind the fan and below the fan shaft, a drip trough 77 surrounding the lower part of the tank, a cold water feed line 78, an overflow pipe at 79 and a main drain at 80.

Water is supplied to the humidifier unit and the cooling tank by means comprising a water supply line 81, a strainer 82, an automatic flow control valve 83 on the back of the machine for supplying the cooling tank, a manually operable valve 84 for the humidifier unit, and a pipe 85 to receive water from the passage controlled by valve 84 and conduct it to the tank of the humidifier unit. An overflow pipe 87 leads from the humidifier unit to the main drain pipe 88.

Heating means for the incubating compartment comprises a primary heating strip 89 above the fan shaft (Fig. 2) and a secondary heating means including a pair of heating strips 90 below said shaft, these strips forming or being provided with electrical heating means and being controlled in a manner hereinafter described.

Referring now more specifically to the wiring diagram shown in Fig. 10, the motor for rocking the egg trays is indicated at 52, said motor being connected to the trays for this purpose by means above described. Motor 52 also rotates the shaft 51 by means including the sprocket chain 53, the sprockets 91 and 92 about which the chain is trained, and reducing gearing in casing 92', indicated at 91b, 51a, connecting the sprocket 91 on shaft 91a (Fig.13) to said shaft 51. The shaft 51 carries a cam 93 (Figs. 10 and 13) for alternate actuation of a pair of switch members 94, 95 that are pivoted at 96, 96, and are biased toward circuit closing position by springs 97, 98 with relation to contacts 99, 100, the cam 93 moving the switch members alternately away from the fixed contacts and the springs closing their respective switches as the movable contacts are alternately released by the cam.

The operations of the tray rocking motor are controlled by a double throw switch 101, whose movable member may be placed in a manual control position where it engages with fixed contact 102 or in a clock controlled position where it engages with a fixed contact 103. The switch 101 may obviously be moved without waiting for the clock to cause the tray turner motor to start, and when it is moved to close the circuit through contact 102 the tray rocking motor is connected directly to the source of power and operates independently of the clock control. At that time the operator will observe the position of the trays and the operation of the tray rocking motor and when the trays approach level horizontal position he moves the switch 101 so as to open the circuit and stop the motor, after which he may load trays or remove stationary trays or perform other operations that require cessation of movement of the trays.

It should be noted that when the tray rocking motor is stopped with the trays in level intermediate position the handle of the reversing switch has also been moved through half its throw and that switch is in the "off" position, so that the current to the fan motor, the heaters and the humidifier is cut off.

After the machine has been loaded or after trays have been returned or changed the switch 101 is again placed in the manual position (in engagement with contact 102) until the operation of the motor 52 has returned them to the previous inclined position. Then the switch is returned to the automatic side, in engagement with fixed contact 103, and automatic operation is resumed.

When it is desired to place the tray rocking motor under control of the clock, so that the tray positions may be reversed and the direction of rotation of the fan may be reversed at intervals of time as predetermined by setting of the clock, the switch 101 is moved manually to engage with stationary contact 103, whereupon the tray rocking motor comes under control of the contacts 104, 105, 106 of the electric clock 107 and the contacts 99 and 100, which in their turn are controlled from the motor 52 by means of the cam 93 on shaft 51. The motor 52 is normally out of operation because its circuit is open at 104.

The diagram of Fig. 10 shows the system in the condition where cam 93 is in operative engagement with pivoted bar 95 so that the contacts at 100 are held open while those at 99 are closed by spring 97. In this condition of the system, should movable contact 104 come into position where it engages with contact 106 the circuit of the motor 52 will nevertheless remain open because the fixed contact 106 is associated directly with the open contacts at 100. However, when the time comes that the clock 107 brings about engagement between the movable element 104 and the fixed contact 105 the circuit of the tray rocking motor will be closed as follows: Source of power 108, switch 101, contact 103, wire 109, contacts 104 and 105, contacts 99, wire 110 and contact 102, motor 52 and ground.

The motor 52 will then operate to rock the trays into the opposite position and its shaft 51 will move 180° from the position shown in the diagram to the dotted line position where the cam 93 will impinge against the upper end of the pivoted bar 94, thereby breaking the circuit at 99 and stopping the operation of the motor 52. The operation of the tray rocking motor 52 will also serve to reverse the reversing switch 111 through connections including an eccentric 112 (Fig. 13) on shaft 51, a lever 113 oscillated by the eccentric through a slot surrounding the eccentric, a link 114 and an oscillatory handle 115 for reversing the switch. Reversal of the reversing switch reverses the direction of rotation of the fan motor 60.

It will be understood that when the clock 107 reaches the position where clock-operated member 104 contacts member 106 then the same series of operations will commence except that the shaft 51 will be rotated to the full line position so as to break the circuit at the contacts 100 and keep the circuit open there, while the contacts at 99 are closed by their spring and the circuit is prepared for energizing motor 52 as soon as the clock contact 104 engages fixed contact 105. It should also be understood that when the cam 93 is moved sufficiently to release one of the circuit closing bars 94, 95, a substantial time will elapse before the cam closes the circuit at the other side, during which time the fan can slow down preparatory to starting in the opposite direction.

At the same time that the turner unit motor 52 is set in action, the fan motor is reversed, so that when the trays are tilted in the opposite sense from their previous inclination, the air currents will pass generally through the woven wire bottoms of the trays and out at the tops of the trays, at one side of the cabinet, whereas at the other side it passes generally into the tops of the trays and out at the bottom it being understood, however, that there is no uniform air current, but the current from the fan is broken up and the draft passes spirally from the tips of the vanes against the top and bottom and sides of the cabinet and forwardly toward the front of the cabinet, and back in the mid-portion thereof. The air tends to crowd toward the middle of a cabinet arranged as in Fig. 3, and so, if there were ample free space between the stacks of trays and the walls of the cabinet, it would tend to circulate about the outside of the cabinet from the fan and back through the middle between the racks and so back to the fan without sufficient circulation among the eggs. Such action is not desirable and is precluded in this apparatus by placing the racks close to the front of the cabinet, leaving only a shallow space (of about one inch deep) at the front of the trays so that much of the air flow must take place between and through the trays.

It will be evident that in its generally spiral flow the air moving away from the fan in Fig. 3 as the fan rotates in a counterclockwise direction will pass downward through the trays at the left of the figure, but will pass at the right-hand side upwardly through the trays when the trays are positioned as shown; and that when the trays are inclined in the reverse sense and the direction of rotation of the fan has also been reversed the flow will be in the opposite direction for each set, i. e., the air at the left will flow generally upward through the trays but will flow downward through the trays at the right of the figure, the fan now rotating clockwise.

It should be noted as a desirable effect of the peculiar mounting of the trays that whereas the momentum of a stack of trays would be very considerable if each tray were supported directly for simple oscillation upon a rod journaled as the front ends of the rods 22 are, and so tend to tilt the trays too far, by mounting one end of the tray on a depending arm 23, i. e. with its center of gravity lower than the other end, this effect is mitigated so that momentum does not offer any problem.

Fig. 11 is a functional or diagrammatic illustration of that part of the wiring system which relates particularly to the heating coil and the humidifier. The primary heating coil is shown at 89 and the secondary heating coil is shown at 90 and these are controlled respectively by the relays 116 and 117 and by the thermostats 118 and 119, respectively. When these thermostats close their contacts the respective relays are energized and the circuits for the heating coils are closed by the armatures of the relays. Similarly the humidifier unit, including motor 72 and heater 73 in casing 62 is controlled in the same manner by the humidistat 120 and the relay 121. The primary heating coil 89 is provided with a pilot light 122 which becomes energized whenever the heating coil carries current. Similarly, the secondary heating coil 90 is provided with a pilot light 123 and the flow control valve 83 is provided with the pilot light 124.

The thermostats 118 and 119 are preferably located on the ceiling of the cabinet approximately ten inches from the rear wall. The primary coil 89 consists of a thinly clad or bare wire so that it will heat and cool quickly, and it is located near the top of the back wall of the cabinet, near its thermostatic control 118. The secondary heat strips 90 are heavily clad for holding the heat and so to keep the temperature nearly uniform, they being controlled through a thermostatic switch 119. This switch breaks the circuit to the secondary heaters at about 98° Fahr., while the primary circuit remains closed to raise the temperature to about 99½° Fahr., at which point the related thermostatic element of the same thermostat breaks the circuit to the primary coil, and closes it again when the temperature falls below 98°, thus maintaining a uniform temperature accurately with a drift of ½° Fahr. or less. The primary coil acts as a sort of anticipator to hold the temperature very close to the optimum for incubation of eggs.

Fig. 12 shows a similar control for the flow control valve 83 of the cooling apparatus. The valve is operated by the solenoid or electromagnet 125 whose energization is controlled by the thermostat 126. 127 is a pilot light which indicates when the cooling apparatus is in operation.

Openings (not shown) are provided in the cabinet wall, preferably at opposite sides of the front wall and above the doors, for permitting a limited amount of air to escape, the loss being made up by air entering at 65. Thus there is a continuous gradual change of air in the chamber.

It will be understood that many variations may be made in the devices disclosed in this application, all without departing from the spirit of the invention; and, therefore, I do not limit myself to what is shown in the drawings and described in the specification, but only as indicated in the appended claims.

Having thus fully described the invention, what I claim is:

1. In an incubator, a stack frame having upright and transverse members, a tilting bar on the frame supported for up and down movement, spaced pins on said bar, spaced pivots on an upright, tray rods suspended at one end from said pivots and journaled in the frame at their outer ends, trays movable endwise into position in a stack, the trays having notches underneath to fit over a tray rod and also having at one end a pair of holes positioned to engage respectively with a pin on a tilting bar and with one of said pivots, a rotary fan, driving means for the fan, and interconnected means for tilting the trays at predetermined intervals and for simultaneously reversing the direction of rotation of the fan.

2. An incubator comprising a cabinet, stacks of egg trays in said cabinet, means for oscillating said trays at intervals upon parallel axes extending lengthwise of the trays in the stacks, a fan at one end of the cabinet, said fan rotating on a horizontal axis, and interconnected means for reversing the direction of rotation of the fan at each oscillation of the trays.

3. An incubator comprising a compartment having a doorway, a plurality of racks mounted for oscillation on axes extending from the doorway toward the rear of the compartment, trays pivotally supported by said racks for movement from an inclined position to an oppositely inclined position, means for reversing the inclination of the trays at intervals, means at the center of the rear end of the cabinet for causing air to move spirally about the casing and through the trays, and interconnected means for reversing the direction of flow of the air whenever the trays are tilted from one position to the other.

4. An incubator comprising a cabinet, at least one tray mounted on an approximately horizontal pivot in said cabinet, means connected to said tray for tilting the same alternately clockwise and counterclockwise from the horizontal about said pivot, a reversible rotary fan located adjacent an end of the cabinet, and interconnected means between said tray and said fan for reversing the direction of rotation of the fan at each tilting operation of the tray.

5. A device as in claim 4, wherein the axis of the fan is horizontal.

6. A device as in claim 4, including a settable clock and interconnected means between the clock and the tray tilting means and fan reversing means for tilting the tray and reversing the fan at intervals predetermined by the setting of the clock.

7. An incubator as in claim 4, including an electric motor for rotating the fan, an electric motor for tilting the trays, and a settable clock in circuit with said motors for causing the trays to be tilted and the direction of rotation of the fan to be reversed simultaneously at intervals predetermined by the setting of the clock.

8. A device as in claim 7 including a manual switch for interrupting the circuit between the tray tilting motor and the clock so as to permit the tray to be tilted about its pivot independently of the clock.

9. A device as in claim 4, including a reversing switch for the fan motor, a tray tilting motor and connections from the tray tilting motor for stopping the fan when the tray is tilted manually into a level position after stoppage of the tray tilting motor.

10. An incubator comprising a cabinet, parallel stacks of trays in said cabinet, said trays being tiltably mounted in axes that are approximately horizontal and parallel to each other, means connected to said trays for tilting them collectively alternately clockwise and counterclockwise about their axes with reference to a horizontal plane, a reversible rotary fan on an axis located in a plane between a pair of stacks, and interconnected means between said trays and said fan for reversing the direction of rotation of said fan at each tilting operation of the trays.

11. An incubator as in claim 10, including a settable clock, and means whereby said clock operates said interconnected reversing means.

12. An incubator as in claim 10, including an electric motor for tilting the trays, a reversible electric motor for driving the fan, a settable electric clock, and interconnected means between said clock and said motors for actuating the tray tilting means and reversing the fan at times predetermined by the setting of the clock.

13. The incubator as in claim 4, said fan having flat blades lying individually in planes radiating from the axis of the fan.

14. An incubator as in claim 10, said fan having blades lying individually in planes radiating from the axis of the fan.

15. In an incubator having a series of egg trays and a supporting frame therefor, the combination of a pair of fixed frame members, a series of tray rods each individually supporting an egg tray, means on one of said fixed members for journaling one end of each tray rod, a series of stub shafts each journaled on the other one of said fixed frame members adjacent the opposite end of one of said tray rods, and a depending link on each stub shaft, each of said stub shafts being connected to the second-named end of a tray rod for supporting said end in depending relation to the respective stub shaft.

16. A device as in claim 15, including means for swinging all of the trays in unison.

17. In an incubator having a series of similarly positioned egg trays and a supporting frame therefor, the combination of a series of tray rods each carrying one of said trays, means on the frame adjacent one end of the egg trays for journaling one end of each tray rod, pivots on the frame adjacent the opposite end of the egg trays, and means for suspending the other end of each of the tray rods from one of said pivots in spaced relation thereto.

*18. In an incubator comprising a support having thereon at least one tray having a bottom and opposite sides, axle means mounting said tray on said support, said axle means engaging one side of said tray adjacent the bottom thereof and the opposite side of said tray at a point above the bottom thereof, means operatively connected to said tray for oscillating the same about the axle, a fan in said incubator, and control means connected to said fan to reverse said fan in timed relation to the oscillations of said tray.*

References Cited in the file of this patent or the original patent

UNITED STATES PATENTS

| | | |
|---|---|---|
| 1,113,955 | Carey | Oct. 20, 1914 |
| 1,213,353 | Graves | Jan. 23, 1917 |
| 1,917,389 | Olsen et al. | July 11, 1933 |
| 1,968,326 | Stover | July 31, 1934 |
| 2,021,479 | Bundy | Nov. 19, 1935 |
| 2,215,664 | Gedge | Sept. 24, 1940 |
| 2,278,205 | Markey | Mar. 31, 1942 |
| 2,281,339 | Taggart | Apr. 28, 1942 |
| 2,287,237 | Gedge | June 23, 1942 |
| 2,325,140 | Lindbergh | July 27, 1943 |